United States Patent
Chen

(10) Patent No.: US 9,401,843 B2
(45) Date of Patent: Jul. 26, 2016

(54) METHOD AND APPARATUS FOR REVERSE LINK CONTROL IN A WIRELESS COMMUNICATION NETWORK AS A FUNCTION OF REVERSE LINK LOAD CHARACTERISTIC

(75) Inventor: Wanshi Chen, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 913 days.

(21) Appl. No.: 11/341,190

(22) Filed: Jan. 27, 2006

(65) Prior Publication Data

US 2007/0177556 A1 Aug. 2, 2007

(51) Int. Cl.
*H04B 7/00* (2006.01)
*H04L 12/24* (2006.01)
*H04W 28/18* (2009.01)
*H04W 52/14* (2009.01)
*H04W 52/26* (2009.01)
*H04W 52/34* (2009.01)

(52) U.S. Cl.
CPC ........... *H04L 41/0816* (2013.01); *H04W 28/18* (2013.01); *H04W 52/146* (2013.01); *H04W 52/267* (2013.01); *H04W 52/343* (2013.01)

(58) Field of Classification Search
CPC ..... H04L 12/5695; H04L 47/14; H04L 47/15; H04L 47/18; H04L 47/20; H04L 47/2416; H04L 47/2441; H04L 47/245; H04L 47/41; H04L 47/72; H04L 47/762; H04L 47/801; H04L 47/803; H04L 47/805; H04L 47/822; H04L 47/824; H04L 41/0816; H04W 28/10; H04W 28/18; H04W 52/148; H04W 52/267; H04W 51/343
USPC ......... 455/453, 67.11, 70, 522; 370/338, 252, 370/229, 310
See application file for complete search history.

(56) References Cited

U.S. PATENT DOCUMENTS

| | | | |
|---|---|---|---|
| 6,597,705 B1 * | 7/2003 | Rezaiifar | H04W 28/18 370/318 |
| 7,024,203 B1 | 4/2006 | Naghian | |
| 7,072,630 B2 | 7/2006 | Lott et al. | |
| 7,453,801 B2 * | 11/2008 | Taneja | H04L 12/5695 370/229 |
| 7,496,367 B1 * | 2/2009 | Ozturk | H04L 47/10 370/329 |

(Continued)

FOREIGN PATENT DOCUMENTS

| | | |
|---|---|---|
| EP | 1601116 | 11/2005 |
| EP | 1830483 A2 | 5/2007 |

(Continued)

*Primary Examiner* — Mahendra Patel
(74) *Attorney, Agent, or Firm* — Coats & Bennett, P.L.L.C.

(57) ABSTRACT

A method and apparatus for controlling one or more aspects of reverse link communications is based on determining reverse link load softness. Such control may be implemented in the network, such as in a base station controller. Control may be sector based, wherein the softness is determined on a per sector basis and one or more aspects of the reverse link communications are adjusted, or otherwise controlled, for each sector as a function of the softness determined for the sector. In at least one embodiment, a base station controller (or equivalently, a radio network controller) is configured to evaluate the softness of reverse link loads for the sectors under its control. In one embodiment, the base station controller makes softness-based control adjustment(s), while in other embodiments, the base station controller transmits softness information and one or more mobile stations make softness-based control adjustments.

31 Claims, 3 Drawing Sheets

(56) References Cited

U.S. PATENT DOCUMENTS

| | | | |
|---|---|---|---|
| 2002/0141349 A1* | 10/2002 | Kim et al. | 370/252 |
| 2003/0031130 A1 | 2/2003 | Vanghi | |
| 2003/0078007 A1* | 4/2003 | Parssinen | H03G 3/3068 |
| | | | 455/67.11 |
| 2004/0121808 A1* | 6/2004 | Hen et al. | 455/561 |
| 2004/0193971 A1 | 9/2004 | Soong et al. | |
| 2004/0203450 A1 | 10/2004 | Cho | |
| 2004/0213182 A1* | 10/2004 | Huh et al. | 370/252 |
| 2004/0259559 A1* | 12/2004 | Li et al. | 455/452.1 |
| 2005/0107090 A1* | 5/2005 | Hosein | 455/453 |
| 2005/0250511 A1* | 11/2005 | Xiao et al. | 455/453 |
| 2006/0073791 A1* | 4/2006 | Senarath | H04W 52/146 |
| | | | 455/67.13 |
| 2006/0146876 A1* | 7/2006 | Kim et al. | 370/338 |
| 2006/0211375 A1* | 9/2006 | Chang | H04W 28/18 |
| | | | 455/67.11 |
| 2006/0229025 A1* | 10/2006 | Gandhi | H04W 52/12 |
| | | | 455/69 |
| 2006/0229089 A1* | 10/2006 | Tokgoz et al. | 455/67.11 |

FOREIGN PATENT DOCUMENTS

| | | |
|---|---|---|
| JP | 2003348644 A | 12/2003 |
| WO | 03101126 A1 | 12/2003 |

\* cited by examiner

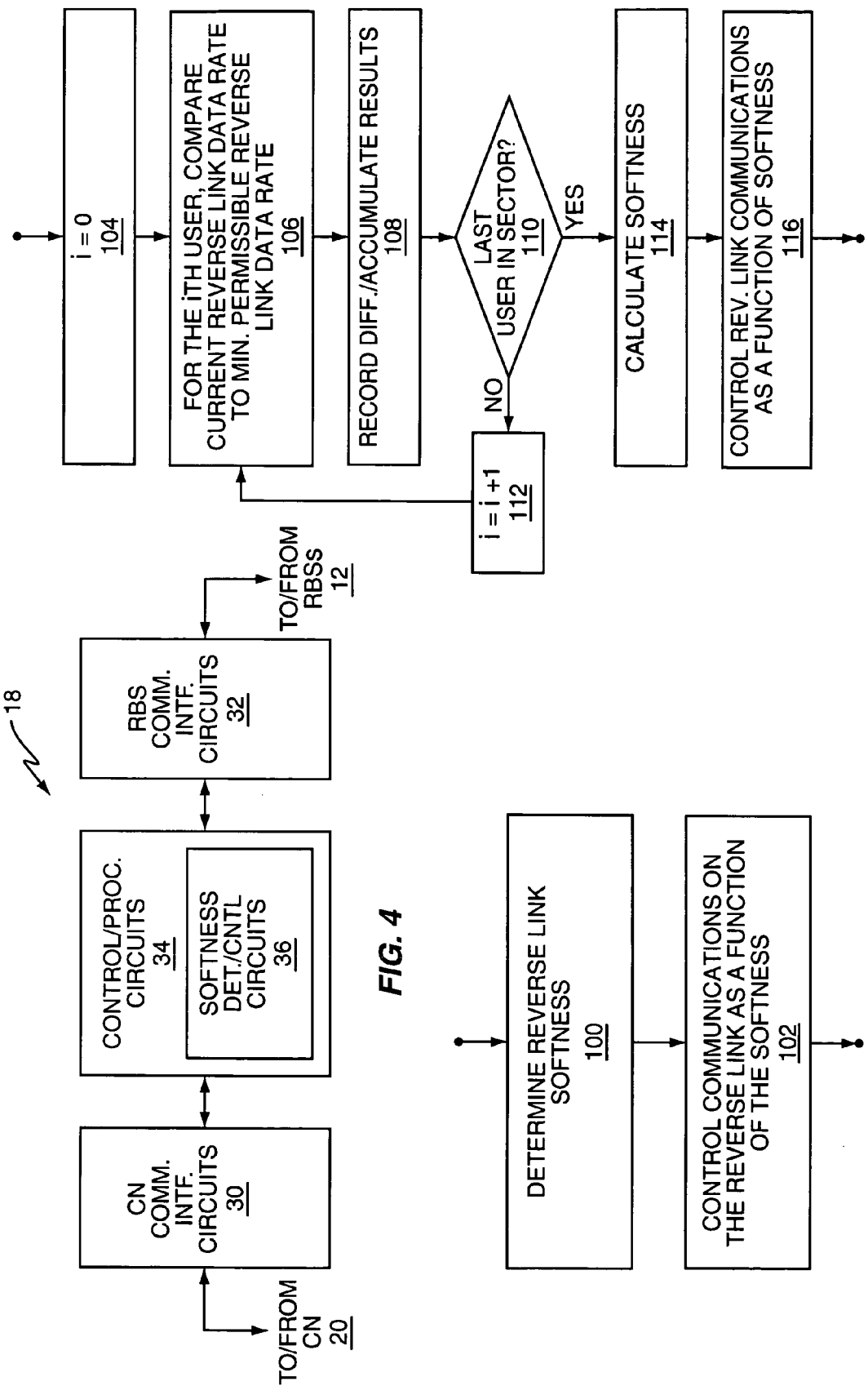

METHOD AND APPARATUS FOR REVERSE LINK CONTROL IN A WIRELESS COMMUNICATION NETWORK AS A FUNCTION OF REVERSE LINK LOAD CHARACTERISTIC

BACKGROUND

The present invention generally relates to, and particularly relates to wireless communication systems, and particularly relates to controlling reverse link communications in a wireless communication network as a function of reverse link load softness.

Existing and developing wireless communication network standards support a variety of applications, such as Voice over IP (VoIP), multi-media messaging, web browsing, email, streaming media, and digital audio/video broadcasting services. Some of these services require comparatively high data rates. For example, the end-user experience may be deemed unacceptable unless a multimedia stream is received at or above 1000 kbps. For other applications, a higher data rate might be preferred, but lower data rates are tolerable. For example, the minimum data rate requirements associated with sending/receiving email may be quite low, as email represents a relatively delay insensitive, non-real-time application.

Several consequences flow from the disparate mix of services and corresponding service requirements that may be active at any given time within a given wireless communication network sector. For example, unlike voice-only networks, wherein no single user consumes more than a small portion of the available network resources, one, or a small handful of data users, can consume a large portion of the network resources available in a given sector. Moreover, the actual amount of resources consumed by one or more such users, such as their forward and/or reverse link loading contributions, may be varied by changing one or more service parameters, at least within the Quality-of-Service (QoS) constraints associated with the application(s) being run by such users.

SUMMARY

In one embodiment, a method of reverse link control in a wireless communication network comprises determining a softness of a reverse link load, and controlling communications on the reverse link as a function of the softness. In at least one embodiment, determining the softness comprises determining the softness of the reverse link load in a given sector of the wireless communication network, and controlling communications on the reverse link as a function of the softness comprises transmitting a softness indicator in the sector. One or more of the mobile stations operating in the sector may thus alter one or more aspects of their reverse link communications as a function of the softness indicator. For example, a mobile station may adjust one or more access probe parameters used by it, such as access probe transmit power, as a function of the softness indicator.

In another embodiment, controlling communications on the reverse link as a function of the softness comprises adjusting one or more access probe parameters to be used by at least some of the mobile stations operating in the sector. For example, a base station controller can be configured to change one or more of the access probe parameters to be used in a given sector as a function of the softness of the reverse link load determined for the sector. By way of non-limiting example in such contexts, the base station controller may increase or decrease the transmit power to be used by mobile stations operating in the sector for transmitting access probes on a reverse link access channel.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 4 is a block diagram of one embodiment of a base station controller that is configured to determine reverse link load softness, and control one or more aspects of reverse link communications as a function of the softness.

FIG. 5 is a logic flow diagram of one embodiment of processing logic for determining reverse link load softness and corresponding reverse link communications control.

FIG. 6 is a logic flow diagram of another embodiment of processing logic for softness-based reverse link communications control.

DETAILED DESCRIPTION

Figure 1:
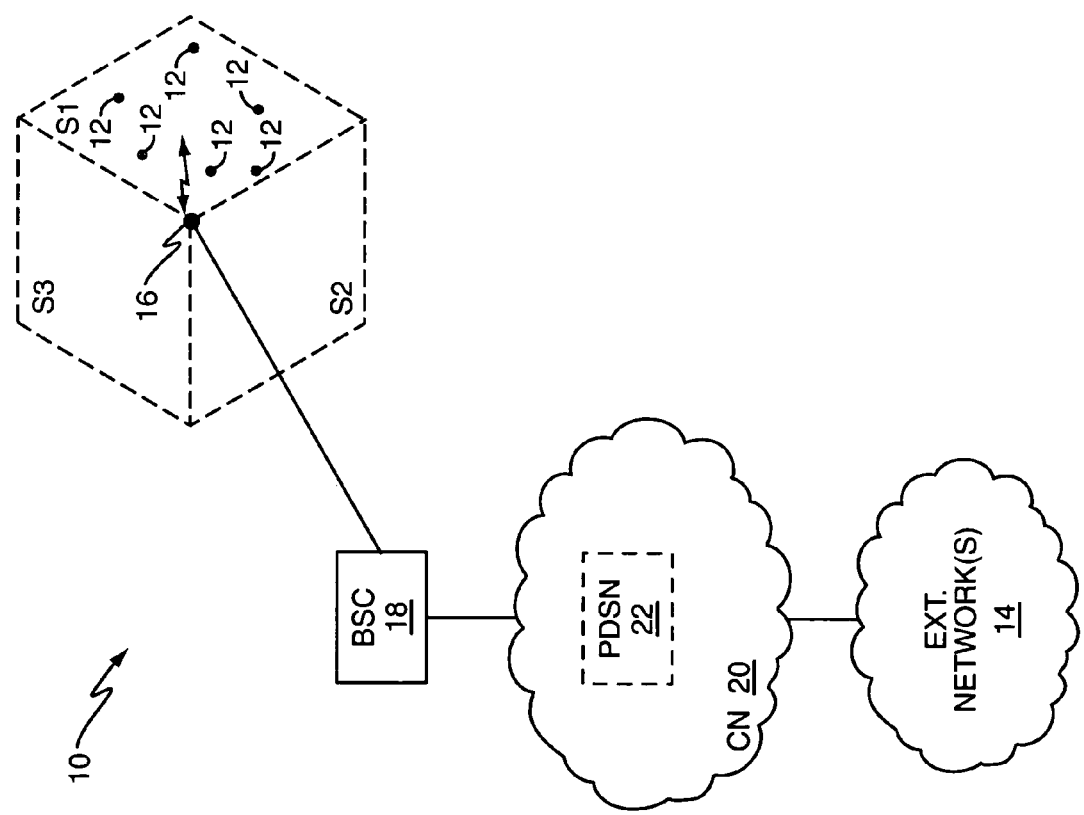
FIG. 1 is a block diagram of one embodiment of a wireless communication network.

FIG. 1 illustrates a wireless communication network 10 that is configured to communicatively couple one or more mobile stations 12 to one or more external networks 14, such as the Internet or other data networks. The network 10 includes a Radio Base Station (RBS) 16, a corresponding Base Station Controller (BSC) 18, and a Core Network (CN) 20, which includes a Packet Data Serving Node (PDSN) 22 or other packet data gateways.

It should be understood that an actual implementation of the network 10 may include multiple RBSs 16, BSCs 18, and so on, and may include elements not illustrated herein. Moreover, it should be understood that different communication standards adopt somewhat different architectures and/or use different nomenclature. For example, in Wideband CDMA systems, the BSCs 18 generally are referred to as Radio Network Controllers or RNCs, while the RBSs 16 generally are referred to as Node Bs. Unless otherwise noted, then, the depiction of a particular network architecture, or the use of standards-related nomenclature should not be construed as limiting communications control as taught herein.

Indeed, as taught herein, one or more aspects of reverse link communications control are based broadly on determining the "softness" of the reverse link load. In this context, "softness" connotes an elasticity or adjustability of the reverse link load, particularly in the sense that the measure of reverse link load softness reflects the amenability of the load to being reduced under control of the network 10 and/or by one or more of the mobile stations 12 that are contributing to that load. For example, the BSC 18 may be configured to evaluate reverse link load softness for a given sector—sector S1, S2, or S3—the network 10, based on determining whether, and by how much, the reverse link data rates of one or more mobile stations 12 currently operating in that sector can be reduced.

If one or a few mobile stations 12 would tolerate a large reverse link rate reduction, or if a larger number of mobile stations 12 would individually tolerate smaller reverse link rate reductions, the reverse link load in the sector is considered to be "soft" in that the level of reverse link loading can be reduced while remaining within the Quality-of-Service constraints associated with the current users—i.e., the overall sector loading can be reduced without violating ongoing QoS constraints associated with the mobile stations 12 that currently are operating in the sector of interest. Conversely if no meaningful reductions in reverse link data rates are possible given the mix of users currently active in the sector, the reverse link load is considered to be "hard."

Figure 2:
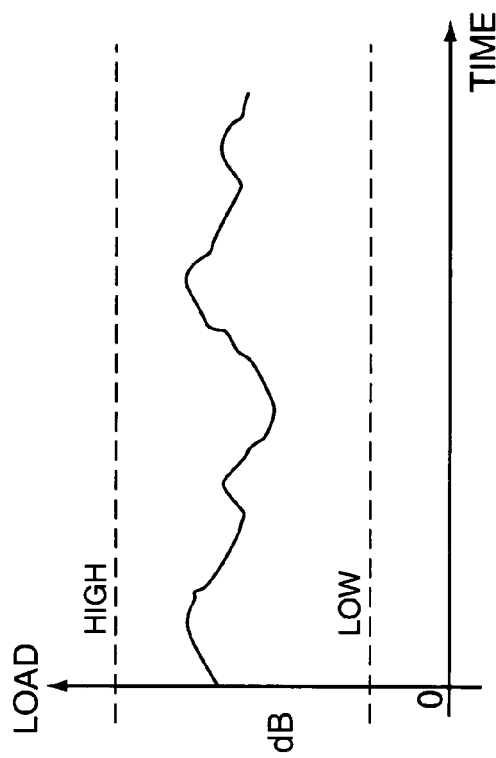
FIG. 2 is a graph of hypothetical reverse link loading over time.

For example, FIG. 2 depicts a hypothetical reverse link load graph, wherein the reverse link load for a given sector of the network 10 changes over time, ranging within a load level that is above a minimum load threshold, but below a maximum load threshold. Reverse link loading may be expressed as a Rise-over-Thermal (RoT) measurement in dBs, but other means of estimating reverse link loading are contemplated herein, such as by counting the number and type of current users in a given sector, and/or by looking at the average, aggregate throughput on the reverse link for the sector. In any case, note that if the reverse link load is below the minimum load threshold, the BSC 18 may forego "softness" based communications control on the reverse link. That is, at very light levels of reverse link loading, controlling one or more aspects of reverse link communications as a function of load softness may not provide significant benefits in terms of admitting new users, etc.

Figure 3:
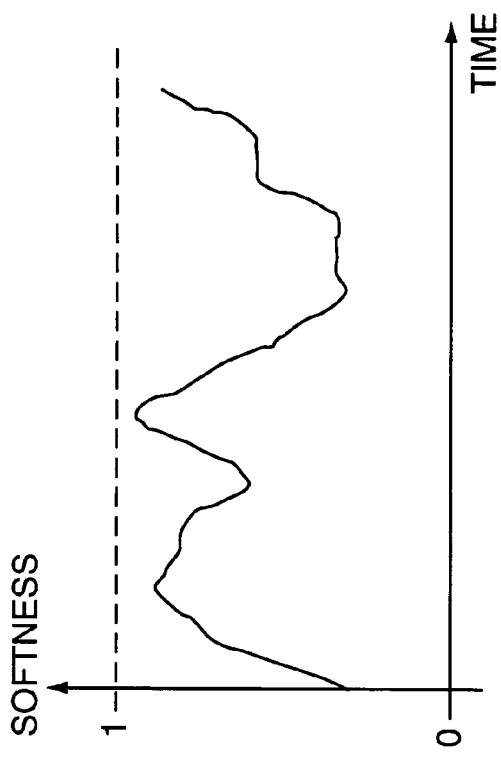
FIG. 3 is a graph of hypothetical reverse link load softness, corresponding to the load graph of FIG. 2.

Regardless, FIG. 3 depicts a hypothetical reverse link load softness graph corresponding to the changing reverse link loading of FIG. 2. One sees that the measure of softness in the depicted graph ranges from 0 to 1, with 0 being fully soft and 1 being fully hard. The numeric measure of softness may range continuously between the fully soft and fully hard values, or may be quantized to any extent. For example, the BSC 18 may be configured to consider the reverse link load for a given sector as soft if the softness metric for that sector is below 0.5, and to consider the reverse link load for that sector as hard if the softness metric is at or above 0.5.

Whether expressed as a continuous or quantized numeric measure, or simply expressed as a logic soft/not-soft logical condition, in one embodiment the BSC 18 is configured to determine reverse link load softness on a per-sector basis by evaluating the difference between current reverse link data rates and minimum permissible reverse link data rates for the mobile stations 12 that are currently operating in the sector. Thus, the BSC 18 can, for example, calculate the difference between each mobile station's current reverse link data rate and the minimum reverse link data rate that is permitted (or appropriate) for the QoS constraints associated with the data application(s) running on that mobile station 12. In addition to considering reverse link rates, or as an alternative, one or more other QoS parameters may be used to determine softness. For example, softness determinations may consider the buffer levels of best-effort users. In one embodiment, the data rate of a best effort user may be reducible from a current rate, while remaining within the applicable QoS constraints, but that user's load could be considered hard if the reverse link transmit buffer is full. (Note that reverse link feedback messages, such as Request messages defined in EVDO, can be used to obtain buffer level information from users.) Other parameters, such as transmit power headroom, delay, etc., may be considered as well in the softness determination.

Further, the determination of softness may be made to vary with time and/or vary with changing usage conditions, or with changing service goals. For example, to give preference to existing users, softness determinations may be biased toward the "hard" side. In on embodiment, a basic softness value is multiplied or otherwise scaled by a bias factor that can be one for unity scaling, less than one to bias the softness value lower (softer), or greater than one to bias the softness value higher (harder). Of course, the lower/higher logic could be reversed, and more than just a simple bias factor could be used to consider swaying the softness determination for multiple input variables.

With the above in mind, FIG. 4 illustrates one embodiment of the BSC 18, wherein the BSC 18 comprises core network communication interface circuits 30, RBS communication interface circuits 32, and control/processing circuits 34. More particularly, the control/processing circuits 34 include one or more processing circuits that are configured as softness determination/control circuits 36. It should be understood that the control/processing circuits 34, including the softness determination/control circuits 36, may comprise hardware, software, or any combination thereof. For example, the control/processing circuits 34 may comprise one or more special-purpose or general-purpose microprocessor circuits configured to execute computer program instructions stored in one or more memory devices or other storage elements included in the BSC 18.

Thus, the illustrated BSC 18 includes one or more processing circuits configured to determine a softness of a reverse link load, and control communications on the reverse link as a function of the softness. Such softness-based determination and control may be performed on a per-sector basis and, in one embodiment, softness-based control of communications on the reverse link is based on the BSC 18 transmitting (via the RBS 16) one or more softness indicators, to cause mobile stations 12 operating in the corresponding sector(s) to alter one or more aspects of their reverse link communications as a function of the softness indicator(s).

Indeed, different softness indicators can be transmitted in the same sector. In one example, different softness indicators are transmitted for different user classes, such as where one class is more preferred or a higher priority. Even if only one softness indicator is transmitted, the manner in which that indicator is calculated can be changed as a function of time, for example. Also, the calculation of softness indicators can be different for different sectors. Further, it should be understood that different mobile stations can be configured to respond differently to the same softness indicator. Thus, the same softness indicator can prompt different responses in individual mobile stations.

In another embodiment, one or more mobile stations 12 may be configured to consider softness for more than one sector. Because of inter-cell interference, for example, a mobile station 12 may be configured to combine, or otherwise consider, the softness of reverse link loads in more than one sector. One method of considering softness in more than one sector is based on combining softness indicators transmitted from different sectors. Combining may include sector weighting considerations, such as weighting the softness indicator of the serving sector more heavily than the softness indicators in neighboring sectors.

In another embodiment, rather than transmitting a softness indicator to cause one or more mobile stations 12 to adjust the reverse link load by altering their reverse link communications, the BSC 18 takes action, such as by transmitting adjusted access probe parameters. More particularly, the BSC 18 may be configured to control communications on the reverse link as a function of the softness by changing one or more access probe parameters according to the softness. For example, the BSC 18 can be configured to increase access probe power for softer reverse link loads and decrease access probe power for harder reverse link loads. In other words, for a relatively soft reverse link load, the BSC 18 can be configured to cause the mobile stations 12 in a given sector to use more aggressive access probing, because the softness means that any increased interference associated with more aggressive access probing can be offset by reducing the reverse link rates of one or more active mobile stations within the area, for example.

Note that using more aggressive access probing is desirable, for example, because it increases the percentages for successful connection to the network 10. In this context, more "aggressive" means, in one embodiment, using higher access probe transmit power(s). For example, assume that the BSC 18 includes a base algorithm for setting access probe power as a function of reverse link loading. With that approach, the BSC 18 generally allows greater power—more aggressive probing—at lower reverse link load levels and lesser power at higher reverse link load levels. In other words, access probe power settings for mobile stations in a given sector of the network 10 generally can be set in inverse relationship to the reverse link load measured or estimated for that sector. However, according to at least one embodiment of reverse link communications control as taught herein, the base algorithm is modified such that the access probe power is set higher than it otherwise would be for a given reverse link loading condition, if the BSC 18 determines that the reverse link load is soft.

For example, the BSC 18 may be configured to evaluate reverse link loads on a per sector basis, for example, and determine corresponding softness metrics as a function of determining, for each sector, whether, and by how much, the current reverse link load can be reduced without violating Quality-of-Service (QoS) constraints associated with the mobile stations 12 that are currently active in the sector. In at least one embodiment, a softness metric is determined as a continuous or quantized value that ranges from 0 to 1, for example, with 0 being soft and 1 being hard. In such contexts, soft may be anything below 0.5, or degrees of softness may be considered, such as 0.2 versus 0.3 or 0.4, for example. More generally, the determined softness is represented as some quantified measure of softness, which may be regarded as an indication of the reverse link load's elasticity or amenability to controlled adjustment.

The communications control that is linked to the softness measure can be "on/off," i.e., do or do not do something, or can be graduated, i.e., change the weighting or magnitude of a control value as a function of the softness metric. Thus, as one example, the aggressiveness of access probing parameters to be used by mobile stations 12 in a given sector of the network 10 can be set in proportion to the softness of reverse link load in that sector—i.e., softer equals more aggressive. Such control can be overlaid onto a baseline algorithm, wherein access probe aggressiveness is controlled inversely proportional to the reverse link load level.

With the above in mind, FIG. 5 illustrates a method of reverse link control in the network 10, according to one embodiment taught herein, wherein the control is based on determining a softness of a reverse link load (Step 100), and controlling communications on the reverse link as a function of the softness (Step 102). As noted, control may comprise transmitting softness indicators in each of one or more sectors of the network 10—e.g., causing the corresponding RBSs 16 to transmit softness indicators in the overhead or broadcast channels in the radio sectors provided by those RBSs 16. In other embodiments, the BSC 18 does not transmit softness indicators per se, but rather transmits control or other signaling information as a function of the determined softness. For example, the BSC 18 may alter or otherwise adjust one or more access probe parameters transmitted to mobile stations 12 in a given sector for which reverse link load softness is being evaluated.

As another example, as part of adjusting access probe parameters, or independently of such adjustment, the BSC 18 may control reverse link rates as a function of reverse link load softness. For example, the BSC 18 may be more or less aggressive in controlling the reverse link rates of one or more mobile stations 12 as a function of the determined softness. In one embodiment, the BSC 18 is biased toward allowing one or more mobile stations to achieve higher reverse link rates if the reverse link load is soft, and is biased toward disallowing one or more mobile stations 12 to achieve higher rates if the reverse link load is hard.

One embodiment of such processing, which may be implemented as a computer program in the BSC 18, or the RBSs 16, or elsewhere in the network 10, is illustrated in FIG. 6. In particular, the program logic of FIG. 6 may be implemented on a per sector basis, wherein there are N mobile stations active in the sector. Logically, processing begins with initializing a user index value i (Step 104), e.g., setting i=0. Processing continues with, for each ith user, comparing the user's current reverse link data rate to a minimum permissible or minimum desired reverse link data rate (Step 106). Such processing includes storing the difference or a metric relating to the difference (Step 108), and determining whether there are more users to evaluate (Step 110).

If so, the user index is incremented (Step 112) and Steps 106-110 are repeated. If not, processing continues by calculating the softness of the reverse link load in the sector being evaluated based on the accumulation of results from Step 108 (Step 114). In one or more embodiments, calculating softness comprises determining the elasticity of the reverse link load in the sector being evaluated based on evaluating an extent to which contributions by one or more current users to the reverse link load in the sector can be reduced, e.g., by determining whether current reverse link data rates for one or more current users can be adjusted downwardly.

Processing concludes for the sector being evaluated, at least for the current calculation interval, by controlling reverse link communications as a function of the softness as just calculated in Step 114 (Step 116). Such control, as noted, in one or more embodiments comprises adjusting access probe parameters to be used by mobile stations 12 operating in the sector and/or adjusting reverse link data rates for one or more of the mobile stations 12 active in the sector. In one or more other embodiments, such control comprises transmitting a softness indicator from a (radio) base station in the network 10 to cause one or more mobile stations 12 operating in the sector for which the softness was determined, to alter one or more aspects of their communications on the reverse link responsive to the softness indicator.

Figure 7:
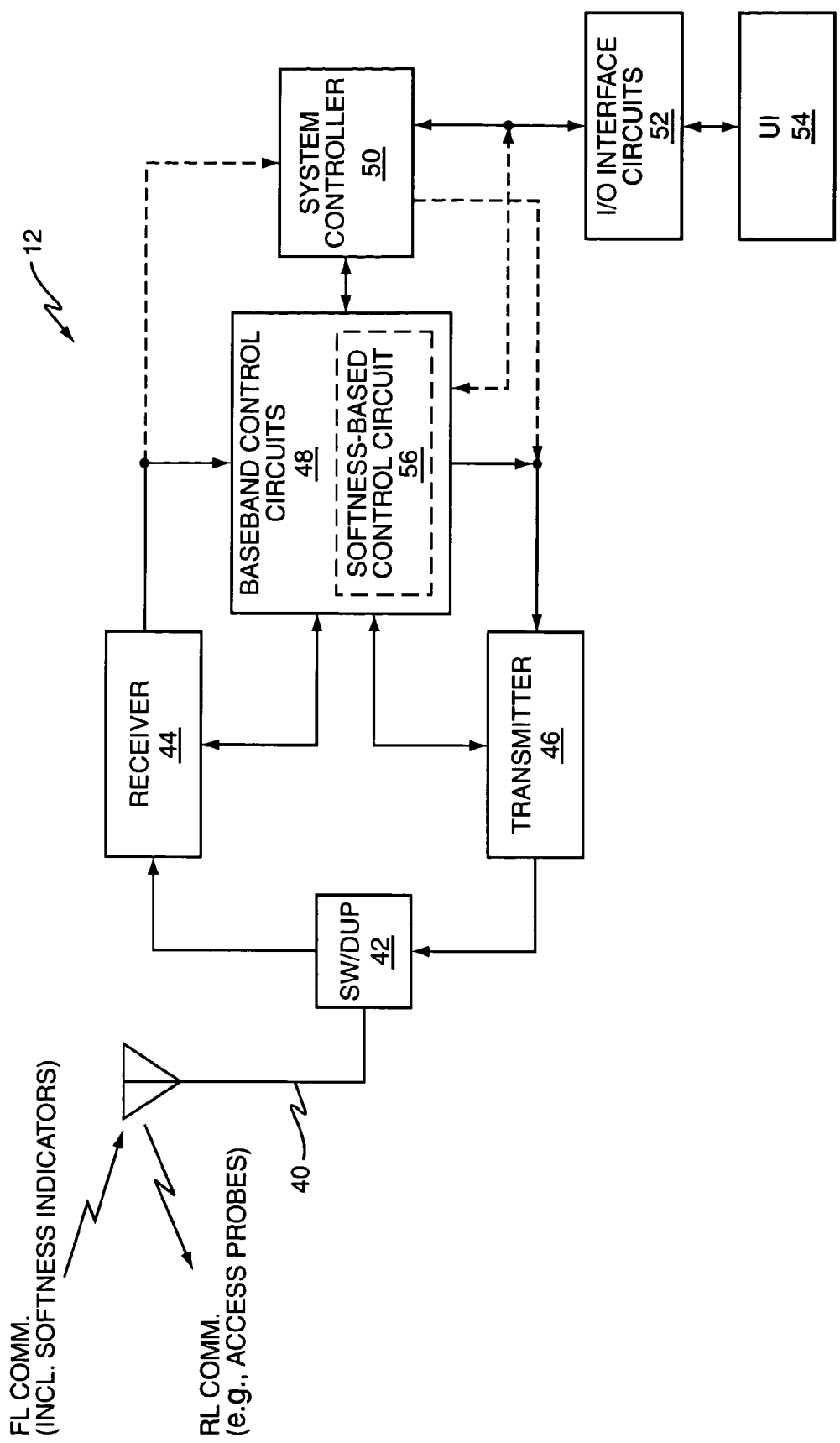
FIG. 7 is a block diagram of one embodiment of a mobile station that is configured to control one or more aspects of its reverse link communications responsive to softness indicator (s) received from a supporting wireless communication network.

FIG. 7 illustrates a mobile station 12, which is configured to control one or more aspects of its reverse link communications responsive to receiving a softness indicator from the network 10. It should be understood that as used herein, the term "mobile station" connotes a broad array of device types, or a mix of such device types. For example, the mobile station 12 illustrated in FIG. 7 (and the mobile stations 12 of FIG. 1) may comprise a cellular radiotelephone, a wireless pager, a Portable Digital Assistant (PDA), a palmtop or laptop computer or a communication module included within a computer, or other type of wireless communication device. It also should be understood that the architectural details of the mobile station 12 and the particular circuit elements incorporated therein will vary with its intended use.

Turning back to the drawing details, the illustrated mobile station 12 comprises a receive/transmit antenna 40, a switch/duplexer 42, a receiver 44, a transmitter 46, baseband control circuit(s) 48, a system controller 50, input/output (I/O) interface circuits 52, and a user interface (UI) 54. The antenna 40 allows the mobile station 12 to receive incoming, forward link transmissions from the network 10, including softness indicators for one or more sectors of the network 10. The antenna 40 further allows the mobile station 12 to transmit signals on the reverse link to the network 10, including access probes on a reverse link access channel.

The mobile station 12 controls the access probes transmitted by it, or controls other aspects of its reverse link communications, as a function of the softness indicator(s) received from the network 10. For example, the network 10 may broadcast a 0-to-1 softness indicator in each sector, such that the mobile station 12 is appraised of the reverse link load softness in its current sector. As noted, the mobile station 12 may adjust one or more access probe parameters as a function of the indicated softness, e.g., it may use a higher access probe transmit power for soft loads and a lower access probe transmit power for hard loads.

A softness-based control circuit 56 may be included in the baseband control circuits 48, and may be configured to provide softness-based reverse link communications control. For example, the mobile station 12 may receive baseline access probe parameters and then adjust one or more such parameters as a function of the indicated reverse link load softness. More particularly, in one embodiment, the mobile station 12 adjusts access probe transmit power from a nominal or initially determined point, as a function of reverse link load softness. The extent of the adjustment can be calculated in proportion to the degree of softness or hardness, or may be based on default adjustment values stored in the mobile station 12 or received from the network 10. For proportional control, the softness indicator can be transmitted as a ranged value comprising a continuous or quantized numeric value that indicates the degree of softness/hardness for the reverse link load in one or more sectors.

Of course, as noted, softness-based control may be implemented within the network 10 rather than in the mobile stations 12, or may be implemented partially in the network 10 and partially in the mobile stations 12. Further, there may be more than one softness-based control active at a given time. For example, softness-based control as taught herein can be configured to consider user class, e.g., "gold," "silver," and "bronze" users classes may be treated differently. In one such embodiment, the aggressiveness with which one or more aspects of reverse link communications are adjusted as a function of softness varies by user class. In one example, gold users are given the most aggressive increases in access probe power for a given softness condition, or are given the least aggressive decreases in access probe power for a given hardness condition. (In such scenarios, a softness metric of 0.3 might be considered soft, for example, while a softness metric of 0.7 might be considered hard.)

Thus, the network 10 can be configured to maintain more than one softness metric, e.g., a different softness metric for each user class, such that it computes different reverse link communications control adjustments per user class and/or transmits different softness indicators per user class. Alternatively, the network 10 can be configured to maintain one softness metric for each coverage area of interest, and the mobile stations 12 can be configured to respond to that softness metric as a function of their user class. The class-based control responses of the mobile stations 12 can be set by the network 10 and/or can be pre-configured in the mobile stations 12.

Broadly, it should be understood that one or more aspects of reverse link communications can be controlled as a function of reverse link load softness. Base stations may carry out such control by adjusting one or more reverse link control parameters used by mobile stations to communicate on the reverse link, as a function of softness. The adjustments may be common to a sector, or to a targeted group of mobile stations, such as a user class group, or may be individualized for selected mobile stations—e.g., different softness-based adjustments can be made to the parameters sent for different groups or classes of mobile stations. Additionally, or alternatively, a base station may be configured to control other aspects of operation as a function of softness, such as by modifying its reverse link data rate controls, admission controls, congestion controls, etc., responsive to softness determinations. As a further addition, or alternative, a base station may be configured to broadcast or unicast—i.e., individualized mobile station signaling—softness indicators, to cause one or more mobile stations to modify one or more aspects of their operation, as a function of softness.

Thus, it should be understood that the present invention is not limited by the foregoing discussion in which selected embodiments were discussed, nor is the present invention limited by the accompanying drawings. Indeed, the present invention is limited only by the following claims and their legal equivalents.

What is claimed is:

1. A method of reverse link control in a wireless communication network comprising:
   determining a softness of a reverse link load by:
      determining a softness metric that indicates an extent to which the reverse link load can be reduced without violating ongoing Quality-of-Service (QoS) constraints associated with current users, wherein the softness metric comprises a value in a continuous range between a fully soft value and a fully hard value, inclusive; and
      comparing current reverse link data rates to permitted minimum reverse link data rates for one or more current users, wherein the softness of the reverse link load is greater with greater differences between the current and permitted minimum reverse link data rates; and
   controlling communications on the reverse link as a function of the softness.

2. The method of claim 1, wherein determining a softness of a reverse link load comprises determining a softness of the reverse link load in a given sector of the wireless communication network, and wherein controlling communications on the reverse link as a function of the softness comprises transmitting a softness indicator in the sector, such that one or more mobile stations operating in the sector alter one or more aspects of their reverse link communications as a function of the softness indicator.

3. The method of claim 2, wherein the one or more mobile stations adjust one or more access probe parameters used in transmitting access probes, as a function of the softness indicator.

4. The method of claim 1, wherein determining a softness of a reverse link load comprises determining a softness of the reverse link load in a given sector of the wireless communication network, and wherein controlling communications on the reverse link as a function of the softness comprises adjusting one or more access probe parameters to be used by mobile stations operating in the sector.

5. The method of claim 4, wherein adjusting one or more access probe parameters to be used by mobile stations operating in the sector comprises adjusting access probe power as a function of the softness.

6. The method of claim 5, wherein adjusting access probe power as a function of softness comprises increasing access probe power for at least one mobile station operating in the sector for softer reverse link loads.

7. The method of claim 6, further comprising decreasing access probe power for at least one mobile station operating in the sector for harder reverse link loads, wherein the reverse link load is deemed harder or softer according to a quantified measure of the softness.

8. The method of claim 1, wherein determining an extent to which the reverse link load can be reduced without violating ongoing Quality-of-Service constraints associated with current users comprises evaluating an extent to which contributions by one or more current users to the reverse link load can be reduced, without violating the ongoing Quality-of-Service constraints associated with those one or more current users.

9. The method of claim 1, wherein determining an extent to which the reverse link load can be reduced without violating ongoing Quality-of-Service constraints associated with current users comprises determining to what extent current reverse link data rates for one or more current users can be adjusted downwardly, without violating the ongoing Quality-of-Service constraints associated with those one or more current users.

10. The method of claim 1, wherein controlling communications on the reverse link as a function of the softness comprises transmitting a softness indicator from a base station in the wireless communication network to cause one or more mobile stations operating in a sector of the wireless communication network for which the softness was determined, to alter one or more aspects of their communications on the reverse link responsive to the softness indicator.

11. The method of claim 1, wherein controlling communications on the reverse link as a function of the softness comprises setting one or more access probe parameters to be used by mobile stations operating in a sector of the wireless communication network corresponding to the determined softness.

12. The method of claim 1, wherein determining the softness of the reverse link load comprises determining the softness of the reverse link load in a given sector of the wireless communication network.

13. The method of claim 10, wherein transmitting the softness indicator from the base station comprises transmitting a ranged value that indicates a degree of softness determined for the reverse link loading in the sector.

14. The method of claim 10, wherein transmitting the softness indicator from the base station comprises transmitting a softness indicator for each of two or more user classes.

15. The method of claim 1, wherein controlling communications on the reverse link as a function of the softness comprises adjusting one or more access probe parameters to be used by mobile stations operating a sector of the wireless communication network for which the softness of the reverse link load was determined.

16. The method of claim 1, wherein controlling communications on the reverse link as a function of the softness comprises controlling reverse link data rates for one or more mobile stations at least in part as a function of softness.

17. The method of claim 1, wherein controlling communications on the reverse link as a function of the softness comprises transmitting one or more reverse link control parameters that are adjusted responsive to the softness.

18. The method of claim 17, wherein transmitting one or more reverse link control parameters that are adjusted responsive to the softness comprises adjusting the one or more reverse link control parameters differently for different groups or classes of mobile stations, and transmitting the differently adjusted reverse link control parameters to their respective groups or classes of mobile stations.

19. A base station controller including one or more processing circuits configured to:
  determine a softness of a reverse link load by:
    determining a softness metric that indicates an extent to which the reverse link load can be reduced without violating ongoing Quality-of-Service (QoS) constraints associated with current users wherein the softness metric comprises a value in a continuous range between a fully soft value and a fully hard value, inclusive; and
    comparing current reverse link data rates to permitted minimum reverse link data rates for one or more current users, wherein the softness of the reverse link load is greater with greater differences between the current and permitted minimum reverse link data rates; and
  control communications on the reverse link as a function of the softness.

20. The base station controller of claim 19, wherein the base station controller is configured to determine a softness of the reverse link load in a given sector of the wireless communication network, and to control communications on the reverse link as a function of the softness by transmitting a softness indicator in the sector, such that one or more mobile stations operating in the sector alter one or more aspects of their reverse link communications as a function of the softness indicator.

21. The base station controller of claim 19, wherein the base station controller is configured to determine an extent to which the reverse link load can be reduced without violating ongoing Quality-of-Service constraints associated with current users by comparing a current reverse link data rate to a minimum permissible reverse link data rate for one or more mobile stations operating in that sector.

22. The base station controller of claim 19, wherein the base station controller is configured to control communications on the reverse link as a function of the softness by changing one or more access probe parameters as a function of the softness.

23. The base station controller of claim 22, wherein the base station controller is configured to increase access probe power for softer reverse link loads.

24. The base station controller of claim 23, wherein the base station controller is configured to decrease access probe power for harder reverse link loads.

25. The base station controller of claim 19, wherein the base station controller is configured to generate different softness indicators for different user classes.

26. The base station controller of claim 19, wherein the base station controller is configured to control communications on the reverse link as a function of the softness by adjusting one or more access probe parameters to be used by mobile stations operating in a sector of the wireless communication network for which the softness of the reverse link load was determined.

27. The base station controller of claim 19, wherein the base station controller is configured to control communications on the reverse link as a function of the softness by controlling reverse link data rates for one or more mobile stations at least in part as a function of the softness.

28. The base station controller of claim 19, wherein base station controller is configured to control communications on the reverse link as a function of the softness by transmitting one or more reverse link control parameters that are adjusted responsive to the softness.

29. The base station controller of claim 28, wherein the base station controller adjusts the one or more reverse link control parameters differently for different groups or classes of mobile stations, and transmits the differently adjusted reverse link control parameters to their respective groups or classes of mobile stations.

30. A mobile station comprising:
a transceiver circuit configured to receive forward link communications from a wireless communication network and configured to reverse link communications to the wireless communication network; and
one or more processing circuits configured to:
adjust one or more aspects of the reverse link communications as a function of a softness indicator received as part of the forward link communications from the wireless communication network, wherein the softness indicator indicates a reverse link load softness metric indicating an extent to which the reverse link load can be reduced without violating ongoing Quality-of-Service (QoS) constraints associated with current users wherein the softness metric comprises a value in a continuous range between a fully soft value and a fully hard value, inclusive, wherein the softness metric is based on a comparison of current reverse link data rates to permitted minimum reverse link data rates for one or more current users, and wherein the softness of the reverse link load is greater with greater differences between the current and permitted minimum reverse link data rates.

31. The mobile station of claim 30, wherein the one or more processing circuits are configured to adjust one or more transmit parameters associated with transmitting access probes on the reverse link to the wireless communication network as a function of the softness indicator.

\* \* \* \* \*